Patented Aug. 30, 1927.

1,640,837

UNITED STATES PATENT OFFICE.

GUSTAF NEWTON KIRSEBOM, OF SALT LAKE CITY, UTAH, ASSIGNOR TO UNITED STATES SMELTING, REFINING & MINING COMPANY, OF PORTLAND, MAINE, A CORPORATION OF MAINE.

METHOD OF CONTROLLING EVOLUTIONS OF ELEMENTAL SULPHUR.

No Drawing.     Application filed November 16, 1925.   Serial No. 69,506.

The present invention relates to a method or process for controlling evolutions of elemental sulphur from sintering machines.

Sintering machines are at present used extensively in lead plants for roasting sulphide ores or semi-roasted products with the double object of disposing of excess sulphur and of obtaining a sinter suitable for charging into the blast furnace. In roasting sulphide ores containing pyrite in sintering machines, trouble has been experienced with fires or explosions of more or less violence in the flue leading from the sintering machine. It is believed that this is caused by elemental sulphur which is deposited in the flue and which, for some reason not understood, becomes ignited and burns or explodes.

These fires and explosions apparently occur more frequently with those types of sintering machines in which roasting takes place with great rapidity, and it is believed that this is because the loose atom of sulphur in $FeS_2$ is volatilized so quickly that it does not have time to be completely oxidized even in the presence of an excess of oxygen. This elemental sulphur passes over with the fine dust from the sintering machine through a flue to the bag house. During this passage through the flue the dust is cooled and a portion of the sulphur settles out or deposits in the interior of the flue, the remainder going into the bag house.

The higher the percentage of pyrite in the charge of the sintering machine, the greater the liability of fire or explosion on account of the larger amount of elemental sulphur formed and passing into the flue.

It is the object of the present invention to avoid this danger of fire and explosion by preventing evolution of the elemental sulphur where ores containing large percentages of pyrite are rapidly roasted. I have discovered that if arsenious oxide is discharged from the sintering machine during roasting, in sufficient amounts, it will combine with the elemental sulphur, resulting in the formation of arsenious sulphide which is less inflammable than elemental sulphur.

The present invention consists in controlling the formation of elemental sulphur in the sintering machines by means of arsenious oxide.

In practising the present invention, a sintering machine, such, for example, as the Dwight & Lloyd type which is characterized by its rapidity of roasting, is charged with the ore to which is added material containing arsenic in such form as to give off arsenious oxide on roasting. I have found that when the arsenic percentage is from two and a half to three per cent almost all of the elemental sulphur formation can be avoided. Furthermore, by providing the proper percentage of arsenic, the percentage of pyrite in the charge may be increased without the formation of elemental sulphur.

The chemical reactions involved are first decomposition of the pyrite according to the formula

$$FeS_2 = FeS + S$$

This takes place in sintering machines as the roasting proceeds and at the same time arsenious oxide is formed which combines with the elemental sulphur to form arsenious sulphide by the formula

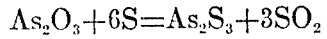
$$As_2O_3 + 6S = As_2S_3 + 3SO_2$$

Generally the oxygen present in the flue gas will decompose the arsenious sulphide into oxide again while the sulphur combines with the oxygen to form sulphur dioxide by the formula

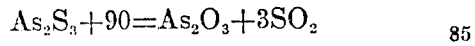
$$As_2S_3 + 9O = As_2O_3 + 3SO_2$$

The arsenious oxide, it has been found, condenses out in the flue at the point where elemental sulphur usually condenses, and if some of the elemental sulphur should escape reaction with arsenious oxide during roasting, it is believed that there will be a slow reaction in the flue between such oxide and such sulphur. It is also believed that the presence of arsenious oxide in the flue may have the effect of diluting the elemental sulphur which is there deposited, thus preventing its ignition.

The arsenic may be added to the roasting charge in various forms, such as arsenical pyrite, speiss, crude arsenic, arsenical flue dusts such as lead blast furnace dust and roaster dust, oxidized arsenic ore such as scorodite and the like. For example, a Dwight & Lloyd sintering machine charge may be made up as follows:

| | Per cent. |
|---|---|
| Lead concentrates preroasted in Wedge furnace | 44.0 |
| Silicious material | 21.0 |
| Iron ore | 7.6 |
| Flotation concentrates | 16.7 |
| Granulated slag from blast furnace | 6.1 |
| Arsenical pyrite | 4.5 | which gives an effective arsenic content in the charge of 1.2% As.

If arsenical speiss is added we may have the following composition of the charge:

| | Per cent. |
|---|---|
| Lead concentrates preroasted in Wedge furnaces | 42.5 |
| Silicious material | 34.8 |
| Speiss | 6.1 |
| Raw sulphides | 16.6 | with an effective arsenic content of 2% As.

Instead of adding the arsenic bearing material to the charge, arsenic may be introduced directly into the wind boxes of the sintering machine, or into the flue itself, and particularly where arsenic is added in the form of a finely divided material like arsenical flue dust and crude arsenic.

Claims:

1. The method of controlling the evolution of elemental sulphur from ores containing sulphide in sintering machines which consists in providing arsenic to combine with the elemental sulphur to form arsenious sulphide.

2. The method of controlling the evolution of elemental sulphur from sulphide ores in sintering machines which consists in providing arsenious oxide in the gases delivered from the machine.

3. The method of controlling the evolution of elemental sulphur from sulphide ores in sintering machines which consists in introducing arsenic bearing material into the charge.

4. The method of controlling the evolution of elemental sulphur from sulphide ores in sintering machines which consists in adding an oxidized arsenic ore to the charge.

5. The method of controlling the evolution of elemental sulphur from sulphide ores in sintering machines which consists in adding scorodite to the charge.

In testimony whereof I have signed my name to this specification.

GUSTAF NEWTON KIRSEBOM.